Oct. 26, 1943. I. E. COFFEY Re. 22,385

AUTOMATIC STARTING DEVICE

Original Filed April 15, 1938 4 Sheets-Sheet 1

Inventor

Irven E. Coffey

By George R. Ericson

Attorney

Oct. 26, 1943. I. E. COFFEY Re. 22,385

AUTOMATIC STARTING DEVICE

Original Filed April 15, 1938 4 Sheets-Sheet 2

Inventor
Irven E. Coffey
By George R. Ericson
Attorney

Oct. 26, 1943. I. E. COFFEY Re. 22,385

AUTOMATIC STARTING DEVICE

Original Filed April 15, 1938 4 Sheets-Sheet 3

Inventor
Irven E. Coffey
By George R. Erickson
Attorney.

Oct. 26, 1943. I. E. COFFEY Re. 22,385

AUTOMATIC STARTING DEVICE

Original Filed April 15, 1938 4 Sheets-Sheet 4

Inventor

Irven E. Coffey

By George R. Ericson

Attorney

Reissued Oct. 26, 1943 Re. 22,385

UNITED STATES PATENT OFFICE 22,385

AUTOMATIC STARTING DEVICE

Irven E. Coffey, Normandy, Mo., assignor to George R. Ericson, Kirkwood, Mo., as trustee Original No. 2,174,313, dated September 26, 1939, Serial No. 202,144, April 15, 1938. Application for reissue February 4, 1943, Serial No. 474,739

39 Claims. (Cl. 290—37)

This invention relates primarily to starting devices for internal combustion engines and consists particularly in novel control mechanism for actuating the engine starter motor responsive to conditioning of the engine for starting and for discontinuing the operation of the starting motor when the engine begins to run under its own power.

Certain features of the invention, and particularly the control mechanism, may be used for controlling other functions of the engine, and the use of the various features of the invention for any purpose is intended to be covered by the claims.

Automotive starting devices now in use are provided with positive manual, electrical, and suction controls arranged so that the engine will start automatically when the throttle valve is opened to the extent which is desirable for starting, provided the generator voltage is insufficient to overcome the battery voltage and there is substantially no suction in the engine intake manifold. With such arrangements, injury to the diaphragm or other part of the suction mechanism may cause cutting in of the starter motor, if the engine speed is reduced sufficiently to permit the generator potential to fall below that of the battery, as frequently occurs, with consequent danger of wrecking the starting mechanism and other associated parts of the engine.

Another disadvantage of such devices results from the fact that the cranking suction in the engine intake passages, particularly, where a thermostatically controlled choke is used, frequently approaches or exceeds the suction existent in these passages when the engine is operating under a heavy load with throttle wide open. If the suction device is arranged to insure an open condition of the starter circuit under the latter conditions, it may also prevent operation or, at least, continuous operation of the starter motor during cold starting, when the choke valve is held relatively tightly closed and when the engine frequently fires several times before running regularly. In the latter case, the starter motor may cut in and out intermittently, clashing the pinion and fly wheel gears and preventing starting of the engine.

An object of the present invention is to provide engine starting device having suction control mechanism functioning to prevent cutting in of the starter while suction exists in the engine intake, but being ineffective to break the starter control circuit.

Another object is to provide engine control mechanism embodying a suction control adapted to insure the circuit remaining open at substantially lower suctions than has heretofore been possible.

Another object is to provide engine control mechanism having throttle and suction control features formed compactly and rigidly upon the carburetor so as to minimize the likelihood of the mechanism getting out of adjustment.

Another object of the invention is to provide a control device having suction control mechanism capable of functioning to prevent operation of the control while a predetermined suction exists in the engine intake passage.

Another object is to provide engine control mechanism including manual and suction controls, the suction control device being more durable than similar devices heretofore in use so as to minimize the possibility of actuation of the control while the engine is running even though some other element of the mechanism may not be in proper condition.

The above objects hereafter appearing are attained substantially by the structures and mechanisms illustrated in the accompanying drawings in which.

Figure 1:
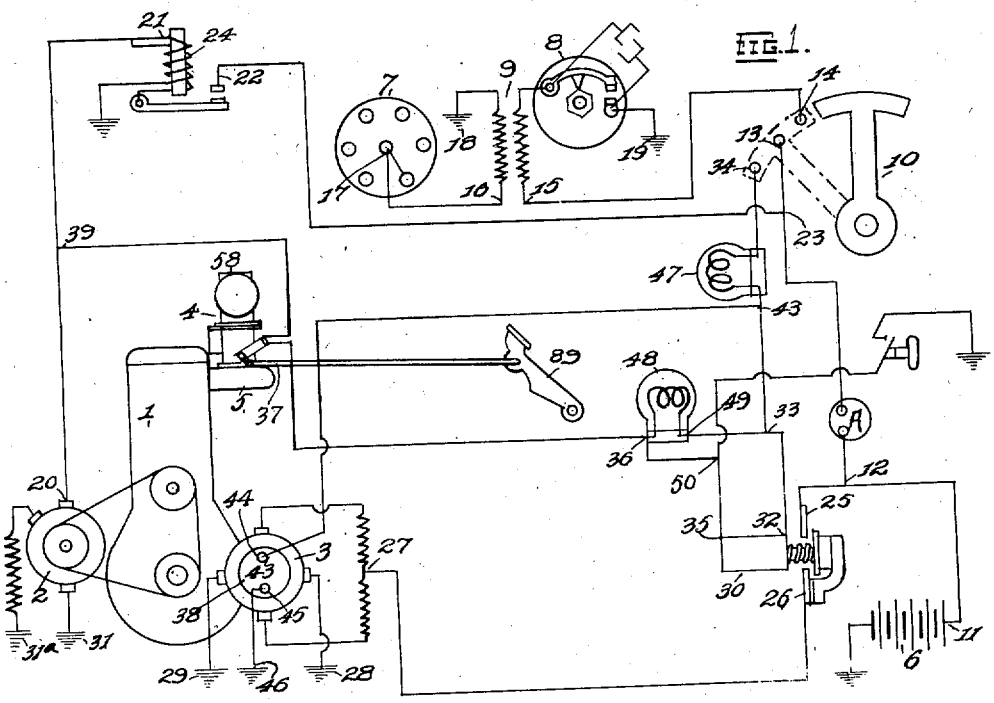
Figs. 1, 9 and 10 are diagrams representing various parts of internal combustion engines with connecting wiring.

Fig. 1 shows an internal combustion engine, generally indicated at 1, having associated therewith the usual generator 2, a self-starter motor 3, and a carburetor 4, communicating with intake manifold 5 for supplying combustible mixture thereto. Also associated with the engine is the usual storage battery 6, distributor 7 which ordinarily includes the breaker point structure 8, and high tension coil 9. Ignition switch 10 is connected to the battery by means of a lead 11—12—13. The switch is, in turn, connected to the breaker points, coil, and distributor by leads 14—15 and 16—17 in a well known manner. The coil is grounded at 18 and the breaker points at 19. A charging lead 20—21—22—23—12—11 connects the generator with the battery, a reverse current relay or cut out, generally indicated at 24, being interposed in this circuit.

Battery 6 is connected to starter motor 3 by means of a lead 11—12—25—26—27, the motor being grounded at 28 and 29 to complete the circuit. Interposed in this circuit is a solenoid control switch 30 having its coil connected at one end to the battery through the ignition switch by means of a lead 32—33—34 and connected at its other end to the generator by means of a lead 35—36—39—20. The generator is grounded at 31 and 31*a*. Interposed in this circuit is a semi-automatic switch device generally indicated at 37 and mounted on the carburetor. This device is shown in detail in Figs. 3–8, inclusive.

Figure 11:
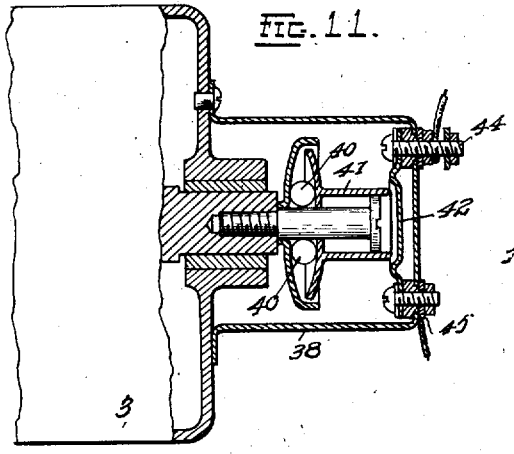
Fig. 11 is a side view, partly broken away and sectioned, showing another part of the mechanism in Fig. 1.
Figure 12:
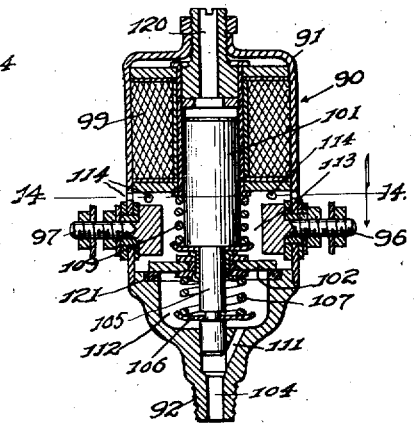
Figs. 12 and 13 are enlarged sectional views, the parts being shown in different positions, illustrating a portion of the mechanism shown in Fig. 10.
Figure 13:
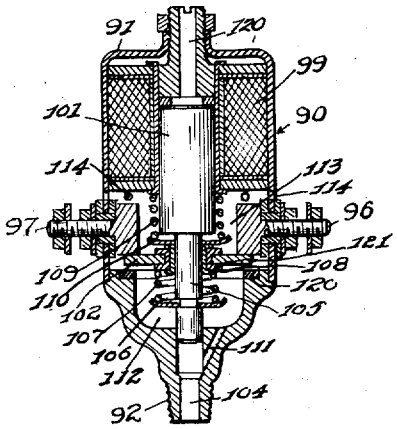

Mounted on the end of the starting motor is a motor speed control device 38 (Fig. 11). Excessive speed of the motor, which may occur with the starter pinion disengaged from the fly wheel, causes balls 40 to be forced outwardly centrifugally which, in turn, moves plunger 41 against metal contact 42. This causes grounding of the connection between switch solenoid 30 and battery 6 by means of a lead 43—44 and a ground lead 45—46. This speed control device, as well as certain other features of the present arrangement, are disclosed and claimed in my Patent No. 2,068,484 issued January 19, 1937.

A resistance 47 is interposed in lead 33—34 between the ignition and solenoid switches. This resistance element is in the form of a light bulb of the type adapted to increase its resistance when it has become heated. The hot resistance of the element 47 is such as to prevent closing of the starter circuit by means of solenoid switch 30, which prevents inopportune actuation of the starter motor when the engine speed and suction are low. A second bulb 48, similar to bulb 47, except that it is of a character to be heated more rapidly, is connected in parallel around switch solenoid 30 by means of leads 32—33—49 and 35—50—36. When resistance 48 is cold, current from the battery is shorted therethrough so that insufficient current passes through the switch solenoid to cause the switch to close. This delays cutting in of the starter motor in case of stalling until the engine has stopped rocking. The feature of limiting the actuation of the starter by variable resistance is also disclosed and claimed in the above mentioned Patent No. 2,068,484.

Carburetor 4 includes a downdraft mixture conduit 50 having a throttle valve 51 pivotally mounted therein on a shaft 52. Mounted on the carburetor is the novel starter switch device, generally indicated at 37. This device includes a chamber 53 formed in the carburetor barrel and communicating with atmosphere, at its lower extremity, by means of an opening 55 (see Fig. 2). At its upper extremity, this chamber communicates with the suction in the mixture conduit posterior to the throttle by means of a passage 56 which connects with a passage formed in rib 57 and extending upwardly into the choke controlling thermostat housing 58, as disclosed in my Patent No. 2,085,351.

Figure 2:
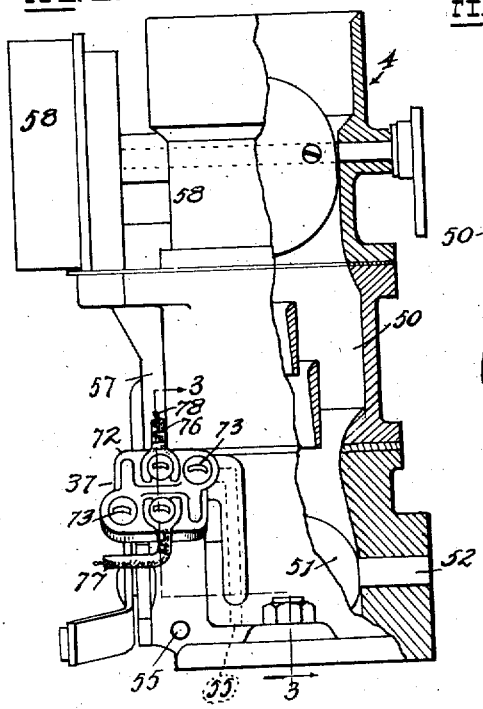
Fig. 2 is a side view showing the carburetor in Fig. 1 substantially enlarged, a portion being broken away and sectioned for clearer illustration.
Figure 5:
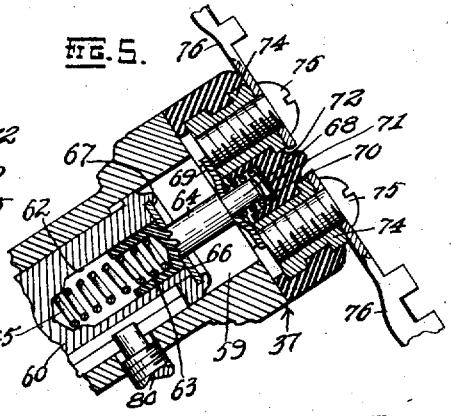
Fig. 5 is an enlarged detail view of parts of the structure shown in Fig. 4.

One end of throttle shaft 52 is cut away to form a semi-circular sector 52*a* which extends through the wall of chamber 53 as shown. Extending outwardly and upwardly from chamber 53 adjacent throttle shaft sector 52*a* is a second chamber 59 which slidably receives a plunger 60 having a dished inner end 61. Plunger 60 is hollowed as at 62 for telescopingly receiving the cup-shaped end portion 63 of a short shaft 64 (Fig. 5). Cupped portion 63 is constantly urged outwardly by a coiled spring 65 and movement of the cup in the outward direction is limited by a washer 66 secured in undercut annular boss or ridge 67 on plunger 60. Shaft 64, at its outer end, has a reduced portion 68 forming a shoulder against which is urged a bow-shaped metal switch blade 69 of resilient material, by a coiled spring 70. Spring 70, at its upper end, is seated, in a hollowed portion 71 formed in cap 72 secured to the upper end of chamber 59 by screws or bolts 73 (Fig. 2). Cap 72 is of suitable insulating material, such as Bakelite or hard rubber, and mounts threaded bushings 74 receiving terminal screws 75 under the heads of which are secured terminal clips 76 for attachment of electrical connections as 77 and 78. Screws 75 extend entirely through insulating cap 72 and are disposed to be engaged by switch blade element 69 when the latter is propelled upwardly.

Figure 3:
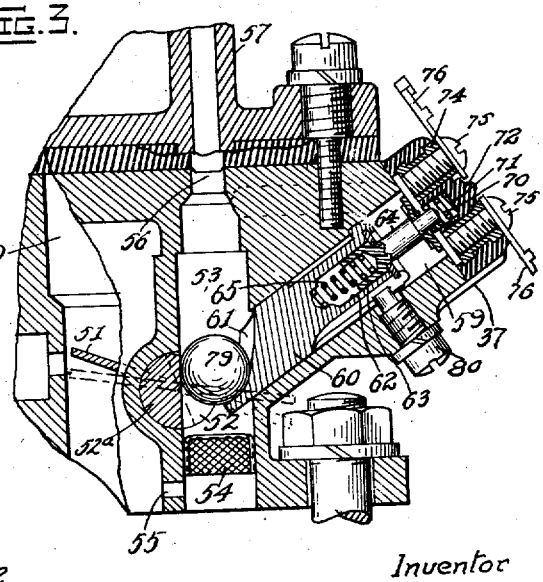
Fig. 3 is a detail sectional view taken substantially on line 3—3 of Fig. 2.

Loosely received in chamber 53 is a ball 79 which, when the carburetor is inactive, and the throttle nearly closed, lodges between the projecting, dished end of plunger 60 and sector 52*a* at the end of the throttle shaft, as shown in Fig. 3. Screen 54 prevents the loss of ball 79 in case it should slip past the plunger for any reason and restrains the entry of dirt into chamber 53. A screw 80 prevents rotation of plunger 60 in chamber 59.

The switch device operates as follows:

When the carburetor is inactive and throttle valve 51 is closed, as shown in dot-dash lines in Fig. 3, ball 79 lodges loosely between the projecting, dished end of plunger 60 and the sector 52*a* on the throttle shaft. Rotation of the throttle valve in the opening direction the amount recommended for starting, in the present instance approximately 40° from the full closed position (Fig. 4), forces ball 79, plunger 60, and switch blade 69 upwardly in chamber 59 causing the switch blade to contact both screws 75 and electrically connect wires 77 and 78 for energizing the starting motor. Blade 69, being of resilient material, collapses slightly when forced against screws 75, as indicated in Fig. 5, so as to provide a wiping action for cleaning the switch blade and terminal screws.

Figure 4:
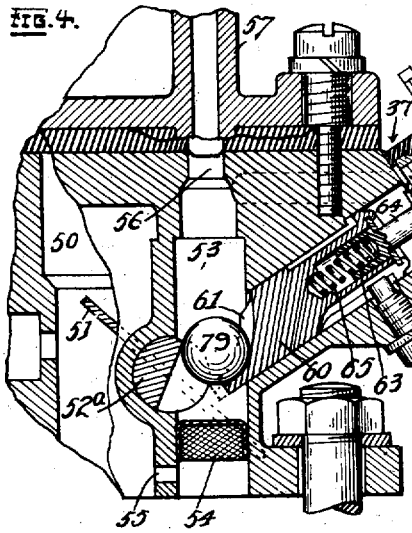
Figs. 4, 6 and 7 are views similar to Fig. 3 but showing the parts in different positions.
Figure 6:
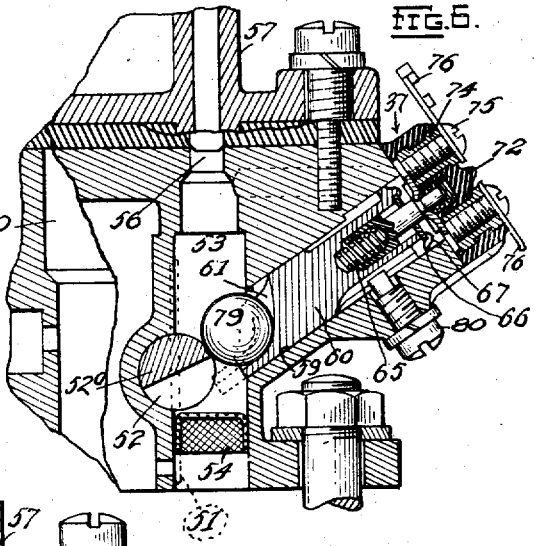
Figure 8:
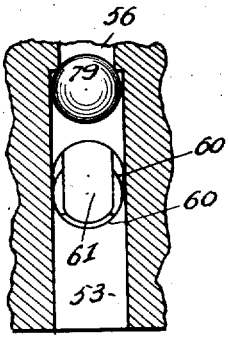
Fig. 8 is a sectional detail view taken substantially on line 8—8 of Fig. 7.
Figure 7:
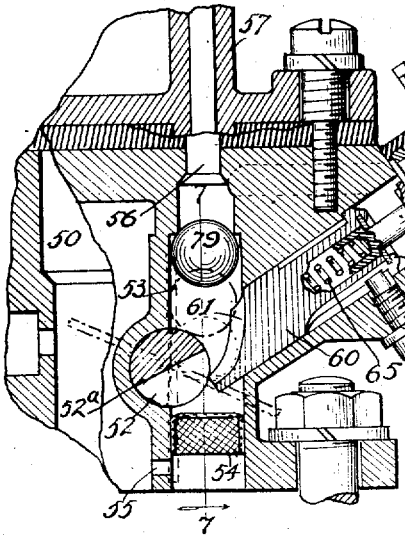

During further opening movement of the throttle valve from the position shown in Fig. 4, spring 65 collapses permitting telescoping of shaft 64 and plunger 60 (Fig. 6). As soon as the engine commences to run under its own power and the throttle valve is released to be closed by the usual closing spring, ball 79 will again be released from its lodgement between plunger 55 and sector 52*a* and will be picked up immediately due to the suction applied thereto through passage 56. Thereafter, throttle valve 51 may be freely manipulated, as desired, without affecting the switch until the suction in the carburetor and passage 56 drops sufficiently to drop ball 79. The ball can then return to its initial position, as in Fig. 3, ready for reclosing of the switch. Fig. 3 shows in solid lines the throttle valve opened less than enough for closing the switch and indicates in dot-dash lines the closed position of the valve.

As indicated in the wiring plan, Fig. 1, closing of switch 37, as described, will actuate switch solenoid 30 so as to close the starter motor circuit, provided substantially no current is flowing from the generator through circuit 20—39—37—33—34 to the battery, this actuation occurring after resistance 48 has become heated, but before resistance 47 becomes fully heated. Closing of the starter motor circuit operates the starter motor to crank the engine, as is well known, and when the engine starts to run under its own power the starter motor pinion will be automatically disengaged from the fly wheel. The arrangement shown in Fig. 1 is intended for use with the Bendix type starter drive. The speed control mechanism shown in Fig. 11 provides for immediate stopping of the starter motor when the motor speed becomes excessive due to unmeshed condition of the starting gears.

The size and weight of ball 79 and the dimensions of suction passage 56 in a practical embodiment are such that the ball will be picked up when the suction in passage 56 corresponds with a manometer reading of approximately ½ inch of mercury, provided the throttle valve is closed or nearly closed, as is shown in Fig. 3. Thereafter, the ball will be maintained in its upper position, positively preventing actuation of the starter switch, until the suction in passage 56 drops to a value of the order of 2 inches of water. This effectually prevents re-engagement of the starter mechanism at any time when the engine is running under its own power, even under the most adverse suction conditions in the intake manifold, while insuring running of the starter motor until the engine is actually started. Ball 79 cannot be picked up by engine suction if the throttle valve is farther open than is shown in Fig. 3 and the ball is wedged between throttle shaft sector 52a and plunger 60. This prevents cutting out of the starter motor circuit by suction alone until the throttle is returned to closed position, with the advantage that as long as the operator holds the throttle pedal depressed so as to maintain the throttle open, as in Fig. 4, the starter motor cannot cut out until the resistance of the generator circuit is sufficient to open switch solenoid 30 or the motor speed becomes excessive.

Figure 9:
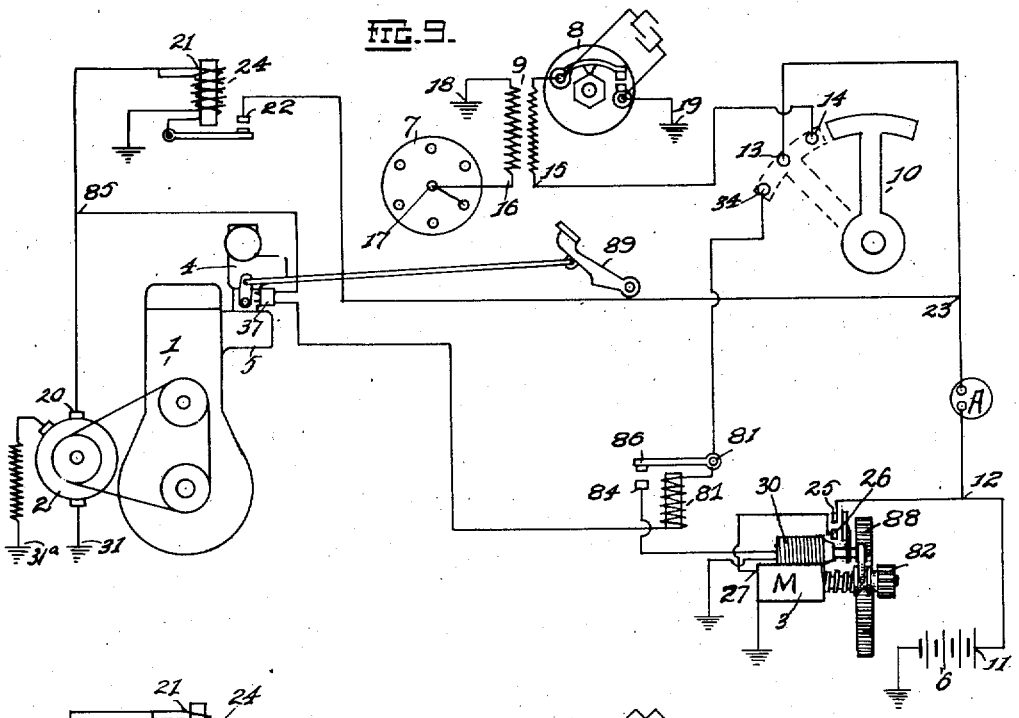

Fig. 9 shows a circuit plan of an arrangement particularly adapted for use with a direct drive starter instead of the Bendix type shown previously. Resistances 47 and 48 are omitted and a reverse current relay 81 is inserted in the circuit between ignition switch 10, connected to battery, and solenoid 30 controlling pinion 82 on starter motor 3. Relay 81, is, in turn, controlled by a circuit 34—81—37—85—20 connecting the grounded generator with battery through the ignition switch. Thus, when semi-automatic switch 37 is closed, as previously described, and ignition switch 10 is also closed, battery current is directed through relay 81, contacting the points 84, 86 thereof, and circuit 34—86—84—32 is thereby completed, energizing solenoid 30, which draws pinion 82 into meshing relationship with fly wheel 88. This movement, in turn, closes circuit 11—12—25—26—27 directly from the battery to the starter motor, actuating the motor so as to crank the engine.

As soon as the generator resistance overcomes the battery E. M. F. relay 81 will be opened so as to cut off battery current to solenoid 30, and, in turn, open switch 25, 26 and stop the starter motor. While the engine is operating, generator current has a direct path through circuit 20—85—21—22—23—12—11 to battery for charging purposes.

Figure 10:
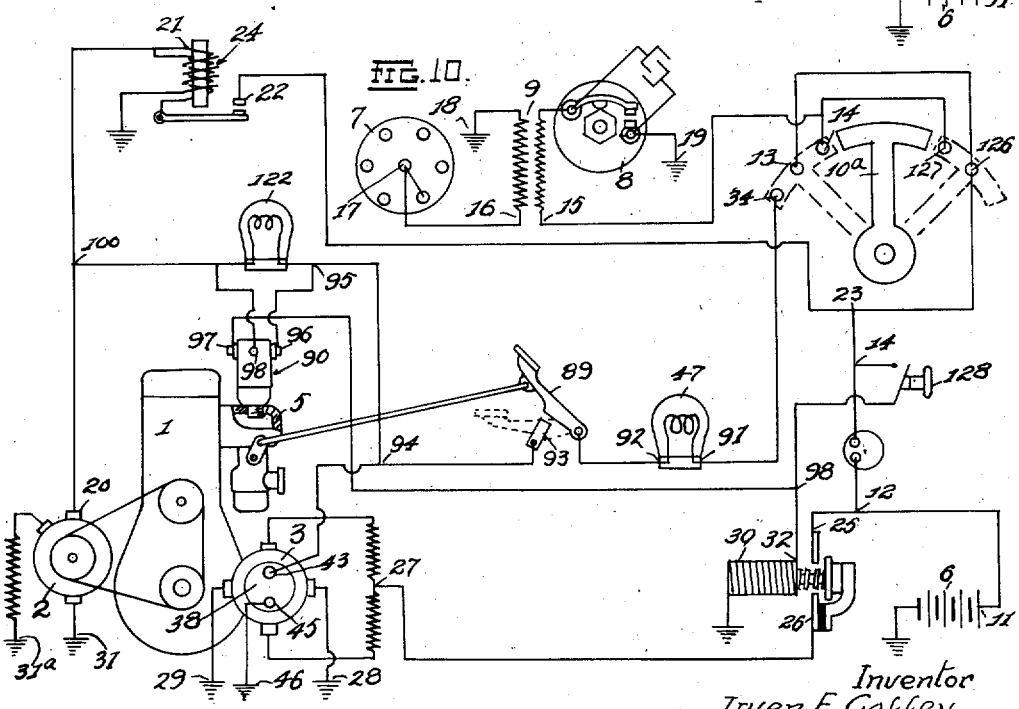

Fig. 10 shows a starter motor circuit 11—12—25—26—27 controlled by a solenoid switch 30, as in Fig. 1. Solenoid 30 is controlled by circuit 34—94—95—96—97—98—32 and interposed in this circuit are a manual switch 93, controlled by throttle pedal 89, and a combination solenoid-suction switch device 90, shown in greater detail in Figs. 12, 13, 14 and 15.

Switch device 90 includes a solenoid 99 connected to terminals 96 and 98, and a core armature 101 carrying a switch bar disc 102 disposed, when the solenoid is energized, to connect terminals 96 and 97 in the control circuit for solenoid 30.

Device 90 has a casing 91 and at its lower end has a threaded boss 92 for attachment to the engine intake manifold and through which extends suction passage 104. Depending from core 101 is a finger 105 with its lower end slidably received in passage 104 for guiding purposes. A washer 106 secured to finger 105 seats a coiled spring 107 which, at its upper end, bears against a grooved annulus 108 of insulating material for yielding support of the switch bar disc. Core 101 is constantly urged downwardly by coiled spring 109 seating against a second washer 110 secured to finger 105.

A diagonal passage 111 connects passage 104 with chamber 112 below disc 102. Chamber 113 above the disc communicates with atmosphere through a series of holes 114 in casing 91. Chamber 113 additionally communicates with atmosphere through port 120 and around loose fitting core 101.

Disc 102, in its lowermost position, seats against an annulus 121 of gasket material. Thus, when solenoid 99 is unenergized, disc 102 is urged downwardly by spring 109 in a manner to seal suction passage 111 from atmospheric chamber 113 so that the engine suction substantially resists lifting of disc 102 and closing of switch controls 96 and 97. In the uppermost or energized position of the core, however, suction in passage 111 is entirely relieved around the disc 102 so that the suction in the engine intake passages cannot function to break the control circuit of motor solenoid 30. This circuit can only be broken when throttle pedal 89 is released to permit closing of the throttle valve, or the generator resistance becomes great enough to prevent actuation of solenoid 30 by the battery current.

A resistance element 122 is connected in parallel with circuit 95—96—98—100 between the ignition switch and the generator and thence to ground. This element, when heated, substantially increases its resistance so as to force sufficient current to pass through solenoid 99 to energize the same. Also connected in this circuit, in series between the ignition switch and the generator, is a second resistance 47 similarly adapted to increase its resistance when heated. Resistance 122 corresponds with element 48 in Fig. 1 and prevents too rapid cutting in of the starter motor after starting. Resistance 47 prevents cutting in of the starter during gradual decreasing of the engine speed, in which case this resistance becomes hot before sufficient battery current flows through coil 30 to close switch contacts 25 and 26. This circuit plan arrangement is also shown in my Patent No. 2,068,484 with the exception of certain features of the solenoid-suction switch device 90.

Figure 14:
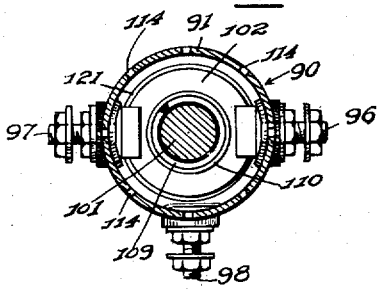
Fig. 14 is a horizontal section taken substantially on the corresponding section line of Fig. 13.
Figure 15:
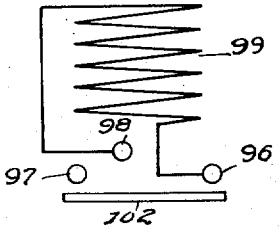
Fig. 15 is a wiring diagram for the device shown in Figs. 12–14.

In order to operate the starter mechanism shown in Fig. 10, the operator moves ignition switch 10a to the left, so as to connect terminal 34 with the battery through circuit 13—126—23—12—11, and then depresses throttle pedal 89 which closes switch 93 and picks up switch bar disc 102, thus completing a circuit between the battery and switch solenoid 30 so as to close the motor-battery circuit switch 25, 26, and energize the starter motor. When the engine starts to operate under its own power, the generator resistance and resistance 47 cooperate to cut out the solenoid switch 30, or this switch may be cut out by releasing of the throttle pedal 89. Suction cannot break the circuit controlling solenoid 30 because of the substantial atmospheric bleed provided around disc 102 within solenoid casing 105, as indicated in Fig. 14. However, when solenoid 99 is unenergized, dropping disc 102, this air bleed is sealed so that thereafter suction in passage 104 substantially resists any tendency to lift disc 102 so as to re-connect terminals 96 and 97.

In this form is also shown means for actuating the starting motor in case the automatic mechanism should become inoperative or damaged for any reason. This means includes switch terminals 126 and 127 which are connected by movement of ignition switch 10a to the right instead of to the left, as previously, this having the effect of energizing the ignition circuit without affecting the starter circuit. Thereafter, button 128 may be depressed for conducting battery current through the solenoid by means of circuit 11—12—14—98—32.

In each of the forms there is shown a device which insures automatic actuation of the starter motor for cranking the engine whenever a manual control such as the throttle pedal is actuated, there is substantially no suction in the engine intake passages, and there is sufficient battery E. M. F. flowing through solenoid 30 to close switch 25—26. Also in each case, the automatic starter circuit is broken immediately when the generator resistance becomes sufficient to prevent actuation of the starter motor solenoid by the battery current, or in case of movement of the manual device, such as the throttle pedal, to the original or rest position. However, in no case can the suction in the engine, which increases sharply when the engine starts to run after being cranked, function to break the starter circuit. This suction is only effective to prevent re-energization of the starter circuit after it is once broken. The arrangements shown and described, accordingly, are very effective to insure proper starting of the engine under all conditions and to prevent cutting in of the starter at any time when the engine is operating under its own power.

Various features of the circuit arrangements and structures shown are not essential and these may be modified in various respects as will occur to those skilled in the art. The exclusive use of all such modifications as come within the scope of the appended claims is contemplated.

I claim:

1. In starting mechanism for internal combustion engines, a starter motor, a source of electrical energy, a connecting circuit for said motor and source, switch means in said circuit, a manual control for said switch means, and additional control means for said circuit arranged to respond to a predetermined suction in the induction conduit of an associated engine for rendering said manual control ineffective, said suction control being unresponsive to said predetermined suction when said switch is closed by coordination of said manual and suction controls.

2. Mechanism as specified in claim 1 further including a carburetor throttle valve for the associated engine, said manual member being movable with said throttle valve and said suction control means being responsive to said predetermined suction for rendering said manual control means inoperative only when said switch is open.

3. In starting mechanism for internal combustion engines, a starter motor and battery circuit, a manual control in said circuit, and an additional circuit control responsive to suction in the intake conduit of an associated engine only when said circuit is open for rendering said manual control inoperative.

4. In mechanism of the class described, a chamber arranged for communication with an internal combusion engine intake conduit, an engine starter switch having an actuator member extending into said chamber, means normally urging said switch open, a manually controlled member in said chamber, and a loaded element having a rest position forming an operative connection between said members whereby said switch will be closed against said means when said manual member is moved to predetermined positions, said element being movable by suction only when said manual member is in other than said position to render said connection inoperative.

5. Mechanism as specified in claim 4 in which said loaded element is responsive to suction to prevent closing of said switch and is unresponsive to suction when said switch is closed.

6. In starting mechanism for internal combustion engines, a battery, a starter motor and a generator electrically coupled with said battery, a starter switch between said battery and said starter, a chamber arranged to be exposed to suction in the induction conduit of an associated internal combustion engine, an element in said chamber constantly urged toward a rest position, and a manual control for said switch, said switch being closed only when said element is in said rest position and said manual control is in predetermined positions, said element being responsive to suction only when said manual control is in other than said positions for rendering said control inoperative.

7. In mechanism for starting internal combustion engines, an induction conduit part for the engine, a throttle valve carried by said part, an engine starter switch, and operative connecting means between said valve and said switch comprising an actuator for said switch, a member adjacent said actuator and movable with said throttle valve, and an element normally urged toward an operative position for rendering said throttle member operative to close said switch, said element being responsive to suction in the engine induction conduit for rendering said manual control inoperative when said switch is open and being unresponsive to suction when said switch is closed.

8. Mechanism as specified in claim 7 in which said element can be moved into and out of its operative position under the influence of varying pressure conditions only when said switch is open.

9. Mechanism as specified in claim 7 in which said switch closes when said throttle valve is moved to a partially opened position, said operative connecting means being of yielding construction to permit opening said throttle valve beyond said position.

10. In starting mechanism for internal combustion engines, a carburetor having a mixture conduit and a throttle valve, a chamber communicating with suction in said conduit, a starter switch having an actuator in the wall of said chamber, a member in the chamber wall adjacent said actuator and movable with said throttle valve, and an element in said chamber normally urged toward a rest position adjacent said actuator and said member for rendering said member operative to close said switch when said throttle valve is opened, said element being responsive to suction only when said switch is open for rendering said member inoperative as a switch control.

11. Mechanism as specified in claim 10, in which said member is arranged for communication with the engine intake suction on one side of said suction responsive element and with atmosphere on the opposite side of said element.

12. In a carburetor, a mixture conduit having a throttle valve, a chamber communicating with said conduit, a member in the wall of said chamber movable with said throttle valve, an engine starter switch carried by the carburetor and having an actuator in the chamber wall, and a loose element in said chamber normally urged toward a position to complete an operative connection whereby said switch is closed when said throttle valve is substantially opened, said element being movable by suction away from said position only when said switch is open.

13. Mechanism as specified in claim 12 in which said throttle valve is mounted on a shaft with a part extending through the wall of said chamber and constituting the switch control member adjacent said actuator.

14. In starting mechanism for internal combustion engines, a starter motor and battery circuit, a manual control for said circuit, an additional circuit control responsive to engine suction only when said circuit is open for rendering said manual control inoperative, and a generator, and an electromagnetic coil in said circuit, said coil having an armature connected to said additional circuit control and normally urged toward a position to open said circuit, said battery being arranged to energize said coil to close said circuit when said generator is substantially inoperative.

15. In combination, an engine control member, a normally open starting circuit including a starting motor and a source of electrical energy, a switch for closing the starting circuit, an element cooperating with said switch shiftable by intake suction and movable to two predetermined positions, said engine control member being operable to close the starting circuit when said suction shiftable member is in one predetermined position and said suction shiftable member being movable by suction to its second position only when said engine control member is in a predetermined position.

16. In starting mechanism for internal combustion engines, a control member for said engine, a starter motor, a source of electrical energy, a connecting circuit for said motor and source, a normally open switch mechanism in said circuit, intake suction movable means cooperating with and forming a portion of said switch mechanism, said suction movable means having at least two predetermined positions, said switch being closed by movement of said control member when said suction movable means is in one position, and said suction movable member being movable by suction to said second position only when said control member is moved from switch closing position.

17. In starting mechanism for internal combustion engines, a starter motor and battery circuit, a control for said circuit including a manual control and a relay operable thereby to control the starting circuit, a generator driven by said engine, said relay being grounded directly through said generator whereby the blocking action of the generator voltage will cause said relay to break the starting motor circuit when the engine starts to run under its own power, a suction controlled member having a first position and a second position, said manual control being effective to cause operation of said relay only when said suction operated member is in said first position, and said manual control being so constructed and arranged as to be ineffective to operate said relay when said suction control member is in its second position, said suction control member being movable to said second position only when said manual control is in a predetermined position.

18. Mechanism as specified in claim 17 in which said manual control has means to interfere with the movement of said suction control member to said second position.

19. Mechanism as specified in claim 17 in which said suction control member is movable by suction to said second position only when said starting motor circuit is open.

20. Mechanism as specified in claim 17 in which said suction control member is movable to said second position only when said manual control is in a predetermined position.

21. In a device of the class described, a body structure having a main passageway therethrough, a throttle in said main passageway, a throttle shaft journalled in said body structure, a switch carried by said body structure and an eccentric on said throttle shaft, a second passageway formed in said body structure, said second passageway having an outlet in said main passageway; and a movable member constructed and arranged to make or break an operating connection between said switch and said eccentric, said movable member having a part located in said last-named passageway and being influenced under certain conditions by the suction therein.

22. In a device of the class described, a body structure having a throttle bore therein, a throttle valve mounted in said bore, a shaft for said throttle valve having an eccentric thereon, a switch contact member carried by said body structure and a suction operable member operably associated with said device and having at least two operating positions, said eccentric being constructed and arranged to transmit operating force from said shaft to said switch contact member when said shaft is operated with said suction operated member in one of said operating positions, but being incapable of transmitting such force when said suction operated member is in the other position.

23. In a device of the class described, a mixing conduit, a throttle for said mixing conduit, a shaft for said throttle, an operating member operated by said shaft, a switch carried by said mixing conduit, said switch having a movable member, an operating connection between said operating member and said movable member, and a suction operated member forming a link in said operating connection, said suction operated member being movable to operative or inoperative position in response to suction conditions.

24. In a device of the class described, a carburetor having a mixing conduit, a switch member mounted on said carburetor, a throttle for controlling the flow of mixture through said conduit, a shaft for said throttle, a suction controlled operating connection between said throttle shaft and said switch, said suction controlled connection comprising a member having a position in which it is capable of transmitting force from said throttle shaft to operate said switch and another position in which it is inoperative, said switch comprising a plunger and a contact member connected to said plunger by a yieldable spring, said switch being actuated under certain conditions at a predetermined point in the opening movement of said throttle, said throttle being movable to fully open position after actuation of said switch by compression of said spring.

25. In a device of the class described, a throttle valve, a switch having a movable member adapted to be controlled thereby, a throttle operating member, an operating connection between said throttle operating member and switch including a motion transmitting member movable into or out of effective position for transmitting motion from said throttle operating member to said movable switch member, said switch being operated by a partial opening movement of said throttle, a spring resisting further opening movement of said throttle after said switch is operated, said spring being sufficiently yieldable to permit the full opening movement of the throttle by the application of additional force thereto.

26. In a device of the class described, a throttle valve, a throttle lever, a switch controlled thereby, means forming an operating connection between said lever and said switch, said switch being operated by a partial opening movement of said throttle, a spring for resisting complete opening movement of said throttle, said spring being sufficiently yieldable to permit the full opening movement of the throttle by the application of additional force thereto, and suction operated means for preventing the operating of said switch by opening of said throttle under certain conditions.

27. In a device of the class described, a throttle valve, a throttle lever, a switch controlled thereby, means forming an operating connection between said lever and said switch, said switch being operated by a partial opening movement of said throttle, a spring resisting complete opening movement of said throttle, said spring being sufficiently yieldable to permit the full opening movement of the throttle by the application of additional force thereto, suction operated means for preventing the operation of said switch by opening of said throttle under certain conditions, said throttle being free to open without being affected by the resistance of said spring when said suction operated means is in position to prevent the operation of said switch by the opening of said throttle.

28. In an internal combustion engine, a throttle for said engine, a control device for said engine, a switch for operating said control device, means for operating said switch under certain conditions by a partial movement of said throttle, yieldable means for resisting a full movement of said throttle when said switch is actuated thereby, and means for interfering with the operation of said switch device by said throttle, said interfering means being operable to permit the full movement of said throttle without interference by said yieldable means.

29. In an internal combustion engine, a throttle valve, a control device, a switch for controlling the operation of said control device, means for closing said switch by a partial opening movement of the throttle when the engine is at rest, yieldable means for resisting the full opening movement of said throttle and means operable after said engine has been started to permit the full opening of said throttle without interference by said yieldable means.

30. In an internal combustion engine, a carburetor having a throttle valve, a control switch, means operable by said throttle valve for actuating said control switch by a partial movement in opening direction of the throttle when the engine is at rest, means yieldably resisting a full opening movement of the throttle under certain conditions, and means including a suction operated member for permitting a full movement in opening direction of said throttle without interference by said yieldable means.

31. In a device of the class described, a carburetor having a throttle valve, a control switch, means operable by partial opening movement of said throttle valve for operating said switch when the engine is at rest, yieldable means for resisting a full opening movement of said throttle valve, said resistance coming into operation only after the operation of said switch and means including a suction operated device for permitting the full opening movement of said throttle without resistance by said yieldable means under certain conditions.

32. In a device of the class described, a carburetor, a throttle valve therefor, a control switch, means operable by a partial opening of said throttle valve when the engine is at rest for closing said control switch, yieldable means for resisting the full opening movement of said throttle valve under certain conditions, and means including a suction responsive device for permitting the full opening of said throttle valve under certain conditions without interference by the resistance of said yieldable means.

33. A carburetor body member having a carburetor induction passage therethrough, a throttle valve mounted in said passage, a throttle shaft mounted in said member transversely with respect to said passage, said throttle shaft having an eccentric surface thereon, a switch member mounted in said body member, and a motion transmitting member movable into or out of effective position for transmitting motion from said eccentric to said switch member.

34. In a device of the class described, a carburetor body structure having a main passageway therethrough, a throttle in said main passageway, a throttle shaft carrying said throttle and journalled in said body structure, a control switch member carried by said body structure, an eccentric on said throttle shaft, a suction operated member having an operating position in which it forms an operating connection between said eccentric and said switch member and another position in which it does not form such a connection, said member being shiftable by suction from one of said positions to the other.

35. A circuit controlling mechanism including a manually operated shaft, a contact member, a suction operable member, means controlled by said shaft for closing a circuit through said contact member when said suction operated member is in a predetermined position, said means being inoperative to close said circuit when said suction operated member is in another position, and means preventing the shifting of the position of said suction operable member by suction when said shaft is in a predetermined position.

36. In an internal combustion engine, a carburetor having a throttle, manual means for operating said throttle, a control switch operable by said manual means, suction controlled means capable of forming a part of the force transmitting connection between said manual means and said control switch, said suction controlled means being movable by suction to a position in which it does not form such part of such force transmitting connection, and means controlled by said manual means for preventing the movement of said suction controlled means to such position.

37. In an internal combustion engine, a carburetor having a throttle, manual means for operating said throttle, a control switch operable by said manual means, suction controlled means capable of forming a part of the force transmitting connection between said manual means and said control switch, said suction controlled means being movable by suction to a position in which it does not form such part of such force transmitting connection, means controlled by said manual means for preventing the movement of said suction controlled means to such position, and yieldable means for limiting the amount of force transmitted from said manual means to said switch.

38. In a device of the class described, a carburetor having a throttle, manual means for operating said throttle, a shiftable contact member, a suction operable member for transmitting force from said manual member to shift said contact member, and yieldable means for limiting the amount of pressure applied to said contact member by said manual member, said yieldable means having sufficient strength to prevent the operation by suction of said suction operable member when said manual means is in a predetermined position.

39. In a device of the class described, a carburetor having a throttle, manual means for operating said throttle, a shiftable contact member, suction operated means associated with the manual member and being so constructed and arranged that its movement to a predetermined position will permit movement of the contact member by said manual member, and a yieldable means for limiting the amount of pressure applied to said contact member by said manual member, said yieldable means having sufficient strength to prevent the operation by suction of said suction operable member when said manual means is in a predetermined position.

IRVEN E. COFFEY.